United States Patent [19]

Skudera et al.

[11] 4,170,757

[45] Oct. 9, 1979

[54] METHOD OF AND APPARATUS FOR TRANSMITTING CLANDESTINE RADIO SIGNALS

[75] Inventors: William J. Skudera, Matawan; Charles M. De Santis, Neptune, both of N.J.; Kurt Ikrath, deceased, late of Elberon, N.J., by Gertrude Ikrath, executrix

[73] Assignee: The United States of America as represented by the Secretary of the Army, Washington, D.C.

[21] Appl. No.: 865,826

[22] Filed: Dec. 30, 1977

[51] Int. Cl.[2] .......................... H04K 1/00; H04B 15/00

[52] U.S. Cl. .......................................... 325/32; 325/40; 325/65; 325/473; 325/477

[58] Field of Search .................... 325/32, 65, 473, 477, 325/125, 141, 40; 333/30 R

[56] References Cited

U.S. PATENT DOCUMENTS

| | | | |
|---|---|---|---|
| 3,478,268 | 11/1969 | Coviello | 325/65 |
| 3,667,049 | 5/1972 | Ostroff et al. | 325/141 |
| 3,706,933 | 12/1972 | Bidell et al. | 325/32 |
| 3,742,496 | 6/1973 | Jezo | 325/141 |
| 3,795,879 | 3/1974 | Whitehouse et al. | 333/30 R |
| 3,876,941 | 4/1975 | Kohlenberg et al. | 325/65 |
| 4,037,159 | 7/1977 | Martin | 325/65 |
| 4,122,393 | 10/1978 | Gordy et al. | 325/65 |

OTHER PUBLICATIONS

"Hughes Fullerton Capability Profile and Applications of Acoustic Surface Wave Devices," Hughes Aircraft Co., 1971.

*Primary Examiner*—Howard A. Birmiel
*Attorney, Agent, or Firm*—Nathan Edelberg; Sheldon Kanars; Edward Goldberg

[57] ABSTRACT

Clandestine signals are transmitted by using a surface wave acoustic device to disperse the spectrum of a pulse-modulated CW carrier. The dispersed signal is itself modulated and then transmitted to a remote location, at low level. At the remote location, an acoustic device of conjugate characteristics is used to recover the dispersed signal from out of the background noise.

9 Claims, 7 Drawing Figures

FIG. 1
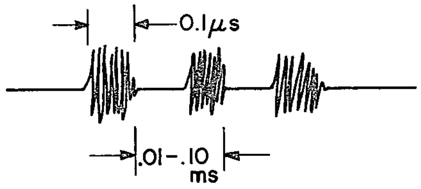
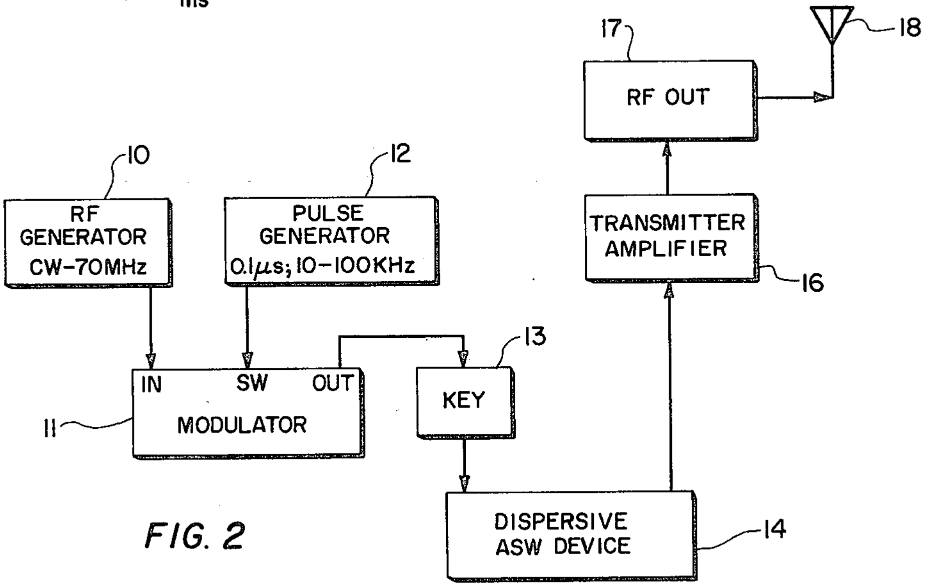
FIG. 2
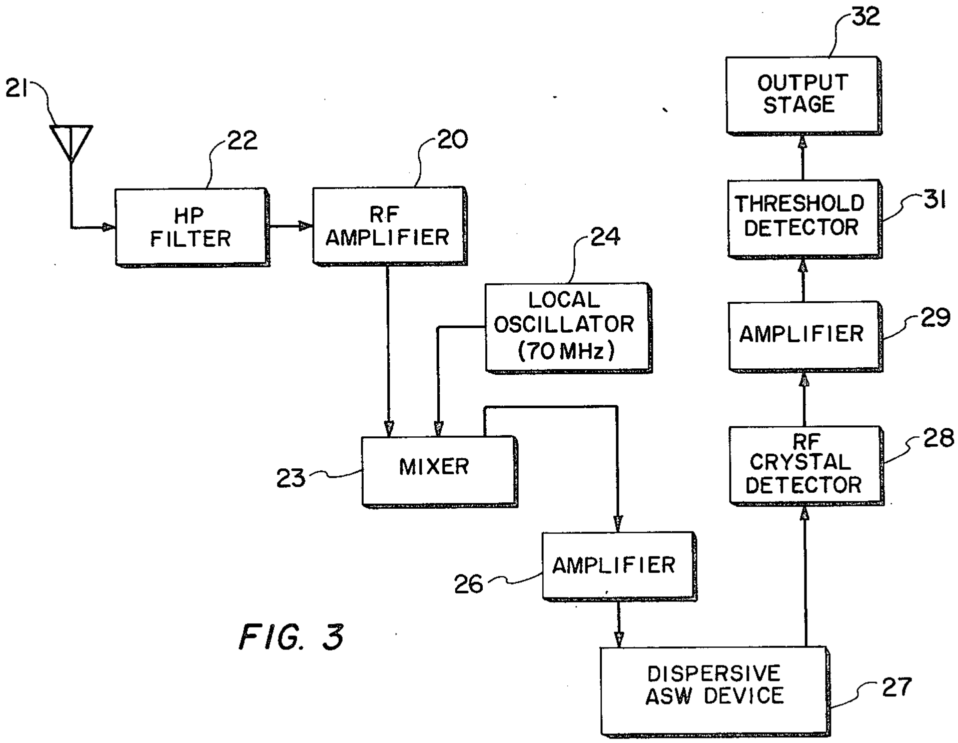
FIG. 3

METHOD OF AND APPARATUS FOR TRANSMITTING CLANDESTINE RADIO SIGNALS

The invention described herein may be manufactured and used by or for the Government for governmental purposes without the payment of any royalties thereon or therefor.

BACKGROUND OF THE INVENTION

1. Field of the Invention

Broadly speaking, this invention relates to the transmission and reception of clandestine radio signals. More particularly, in a preferred embodiment, this invention relates to the transmission and reception of clandestine radio signals having dispersed frequency spectra.

2. Discussion of the Prior Art

The ability of the Allies to intercept and decode German and Japanese military communications greatly hastened the end of World War II. With modern computers able to decode almost any coded message, the emphasis has shifted more towards making the transmission itself "invisible" rather than to further improving encryptation techniques.

Clandestine radio transmissions are also useful for person-to-person communications in connection with military operations conducted in built-up areas where the existing natural and manmade radio noise may be used as a cover against signal interception by third parties. Clandestine signals are also useful in Identification Friend or Foe (IFF) applications as they can safely be used without alerting the enemy to their existence or nature. Other applications are the search for, and location of, downed aircraft and airmen, and specialized, information "double talk" transmissions. In this latter application, a clandestine signal is used to notify an authorized clandestine receiving station of the "truth value" of the information transmitted over the regular radio channel which may, incidentally, be operating on the same frequency as the clandestine signal transmitter.

SUMMARY OF THE INVENTION

In the invention disclosed and claimed herein, the frequency spectrum of a pulse-modulated CW carrier is dispersed by the use of the dispersive acoustic surface wave device. The dispersed signal is then transmitted at low level to a distant receiver which is equipped with an acoustic surface wave device which has a characteristic conjugate to that of the device at the transmitter. In another embodiment, the CW carrier is pulse-position modulated with an audio signal. In yet another embodiment, a clandestine signal is used as a phase reference to decode a signal which is transmitted at a low frequency via a ground loop, or the like.

The invention and its mode of operation will be more fully understood from the following detailed description when taken with the appended drawings, in which:

DESCRIPTION OF THE DRAWINGS

FIG. 1 is a graph showing a periodic pulse train of the type employed in the circuit shown in FIG. 2;

FIG. 2 is block schematic diagram of a first illustrative clandestine radio transmitter according to the invention;

FIG. 3 is a block schematic diagram of a first illustrative clandestine radio receiver according to the invention;

DESCRIPTION OF THE PREFERRED EMBODIMENTS

Figure 4:
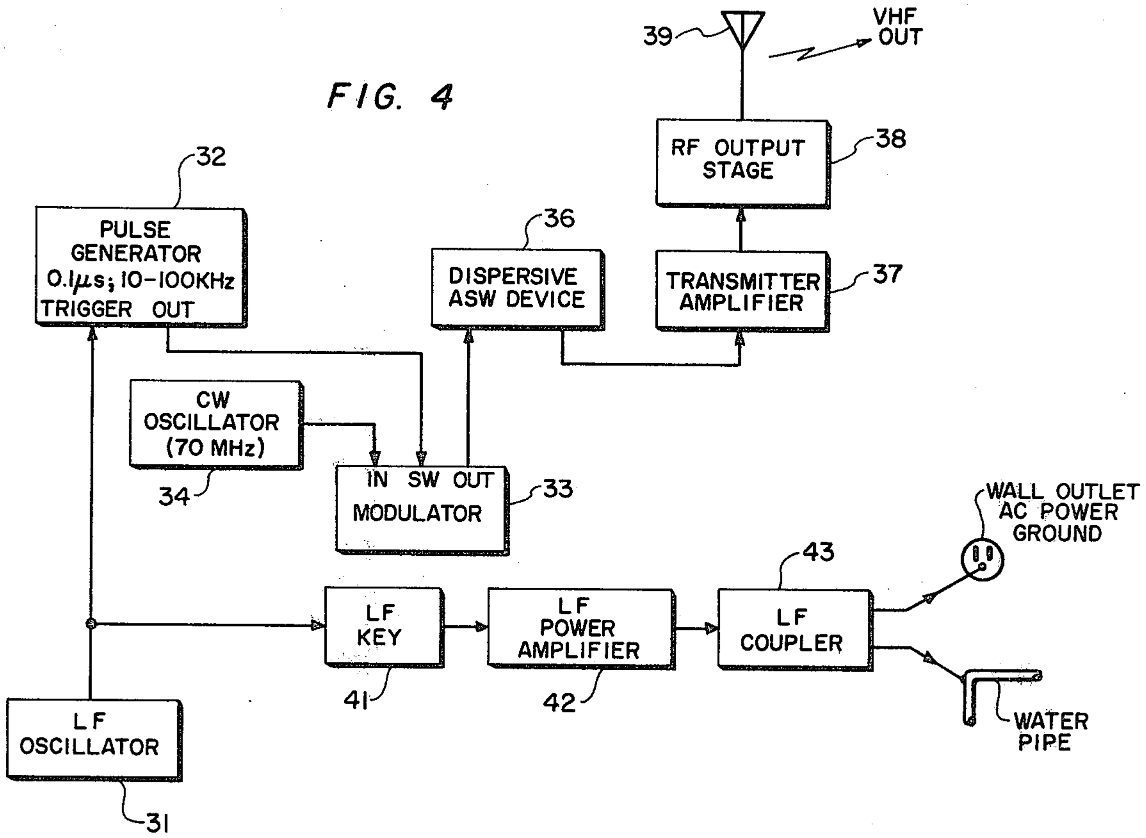
FIG. 4 is a block schematic diagram of a second illustrative clandestine transmitter according to the invention, said transmitter including a low-frequency transmitter portion.

Referring to FIGS. 1 and 2, in a first illustrative embodiment of the invention, a 70 mHz carrier is 100% AM modulated with a 0.1 $\mu$S pulse having a pulse repetition rate in the 10 to 100 kHz range. The envelope of this pulse-modulated carrier conforms ideally to a sin (x)/x function. As shown in FIG. 2, an RF generator 10 is connected to a modulator 11 which also receives an output of a pulse generator 12. The output of modulator 11 is connected to the input of a dispersive acoustic surface wave device 14, via a keyer 13. The output of device 14 is connected to an amplifier 16 thence to an RF output stage 17 and an antenna 18.

As previously mentioned, the envelope of the pulse-modulated carrier conforms ideally to a sin (x)/x function. The clandestine signal is obtained by a specific type of dispersion (and corresponding expansion) of this spike-like sin (x)/x spectrum within the impulse bandwidth of the original pulse. In the illustrative system disclosed in FIG. 2, the sin (x)/x spike-like frequency spectrum is dispersed and expanded by means of a dispersive acoustic surface wave device 14 which is specifically designed for this system. The overall dispersion of ASW device 14 is quantified by a delay of 10 microseconds over a 10 MHz bandwidth centered about 70 MHz.

Though dispersion implies a variation of the phase relationship between the components of the pulse spectrum as a function of their frequency, the dispersion process preserves the intrinsic coherency between the spectrum components while expanding the carrier centered energy over the whole bandwidth. The resultant clandestine signal spectrum is, therefore, intrinsically coherent, whereas the overall wave shape of the clandestine signal resembles that of a wide band noise. It follows, therefore, that this wide-band, noise-like clandestine signal conveys the signature of dispersive acoustic surface wave device 14.

Futhermore, when the level of the noise-like clandestine signal is adjusted to be equal to, or less than, that of the natural and man-made radio-frequency noise and interference in the area, it becomes practically impossible to detect the emission of the clandestine signal by conventional RF field-strength and spectrum measurements, particularly in radio noise-polluted urban areas. As described below, the clandestine signal transmissions become detectable only upon proper contraction of the dispersed signal spectrum and subsequent threshold discrimination of the signal relative to the noise.

As will be seen from a study of FIG. 3, reception of the clandestine signal is achieved by the restoration of the original pulsed carrier spectrum by conjugate dispersion, i.e., the contraction of the received signal spectrum which is buried in the noise. To this end, the receiver shown in FIG. 3 passes the noise, and the clandestine signal buried in the noise, through an acoustic surface wave device that has an exactly conjugate dispersion characteristic to the acoustic surface wave device used in the transmitter. Consequently, the incoherent noise becomes further dispersed by the DASW device in the receiver, whereas the clandestine signal spectrum is contracted into the sin/(x)/x type spectrum of the original pulsed carrier. The peak levels of the restored, pulsed carrier exceed the noise levels such that a biased detector can be used to detect the signal pulse above the dispersed noise.

More specifically, as shown in FIG. 3, the clandestine receiver comprises an R.F. amplifier 20 connected to an antenna 21 via a high-pass filter 22. The output of amplifier 20 is connected to a mixer 23 which also receives the output of a local oscillator 24.

The IF output from mixer 23 is amplified by an amplifier 26 and applied to acoustic surface wave device 27. The output of device 27, in turn, is applied to a crystal detector 28, thence via an amplifier 29 to a threshold detector 31 and output stage 32.

In the arrangement shown in FIG. 3, this threshold detection mechanism, in conjunction with the time constant of the crystal detector, provides an effective and simple means for discriminating the signal from the noise, which in this case also includes interference from voice signals which are transmitted on the same 70 MHz carrier frequency.

In this connection it should be pointed out that it is also possible to use a pair of dispersive devices having identical rather than conjugate characteristics. In this embodiment, the conjugate dispersion and the corresponding contraction of the clandestine signal spectrum at the receiver is approximated by the inversion of the upper and lower side bands of the clandestine signal relative to the 70 MHz center frequency. In this embodient, the incoming noise-covered, clandestine signal is mixed with a 140 MHz signal rather than a 70 MHz signal, and the resultant mixing product is then fed into DASW device 27.

A series of experiments were performed to verify the operation of the circuits shown in FIGS. 2 and 3. In one experiment, a transmitter, operating at less than 1 milliwatt, caused the emitted clandestine signal to become completely buried in the existing noise and radio interference. Nevertheless, manually or automatically keyed clandestine signal emissions were clearly received by use of the dispersive acoustic surface wave device in the receiver and the threshold detector. The received signal wave shape and the noise background at the output of the acoustic device were observed on a scope. As mentioned previously, the background noise includes manmade radio interference from VHF TV and radio stations. In another experiment, the clandestine radio transmitter operator produced strong radio interference by transmitting voice over a 70 MHz carrier from a VHF transmitter using a Whip antenna which was positioned very close to the antenna of the clandestine radio XMTR. The voice transmissions were then picked up by a receiver which was positioned next to the clandestine signal receiver. The "Truth" or "Falsity" of statements broadcast over the VHF transmitter was then conveyed to the clandestine receiver operator via the clandestine signal channel, thus demonstrating the usefulness of the system.

In another experiment, the same clandestine transmitter was used to determine if the clandestine signal emission could be detected and monitored with a typical VHF man-pack radio set. Listening to the normal noise and RFI background, as picked up by the VHF receiver (squelch-off) at around 70 MHz, the operator was able to sense the clandestine signal emission by an apparent increase in audible noise from the clandestine transmitter while observing at the same time the signal displayed by the clandestine signal receiver. However, when the strength of the clandestine signal was reduced by 5 dB or more, the VHF operator lost the ability to discriminate between clandestine signal-induced variations in the audible noise level from natural fluctuations of this noise level.

In yet another embodiment of the invention, a clandestine VHF radio signal is used to transmit a standard of coherence for an LF conduction system. This arrangement exploits urban RF noise and urban structures to protect and to shield communications against jamming and interception.

More specifically, information is transmitted by means of the relative phase between the clandestine VHF radio signal and the LF conduction signal. In the simplest case, the LF signal is keyed on and off (automatically or manually) while the clandestine VHF radio signal which serves as a phase reference is kept on continuously.

Obviously, more sophisticated modulation techniques could be used for the LF conduction signal, for example, PPM or PWM.

As shown in FIG. 4, the transmitter comprises a LF oscillator 31, for example, a 50 KHz oscillator, which is connected to the trigger input of a pulse generator 32, the output of which is connected to a modulator 33 to modulate the output of a 70 MHz CW oscillator 34. The output of modulator 33 is connected to the input of a surface wave acoustic device 36, thence, via an amplifier 37 and an RF output stage to VHF antenna 39.

The output of LF oscillator 31 is also applied, via a keyer 41, to a LF power amplifier 42 thence, via a coupling device 43, to some suitable LF antenna, for example, ordinary household water pipes or ac mains wiring.

Figure 5:
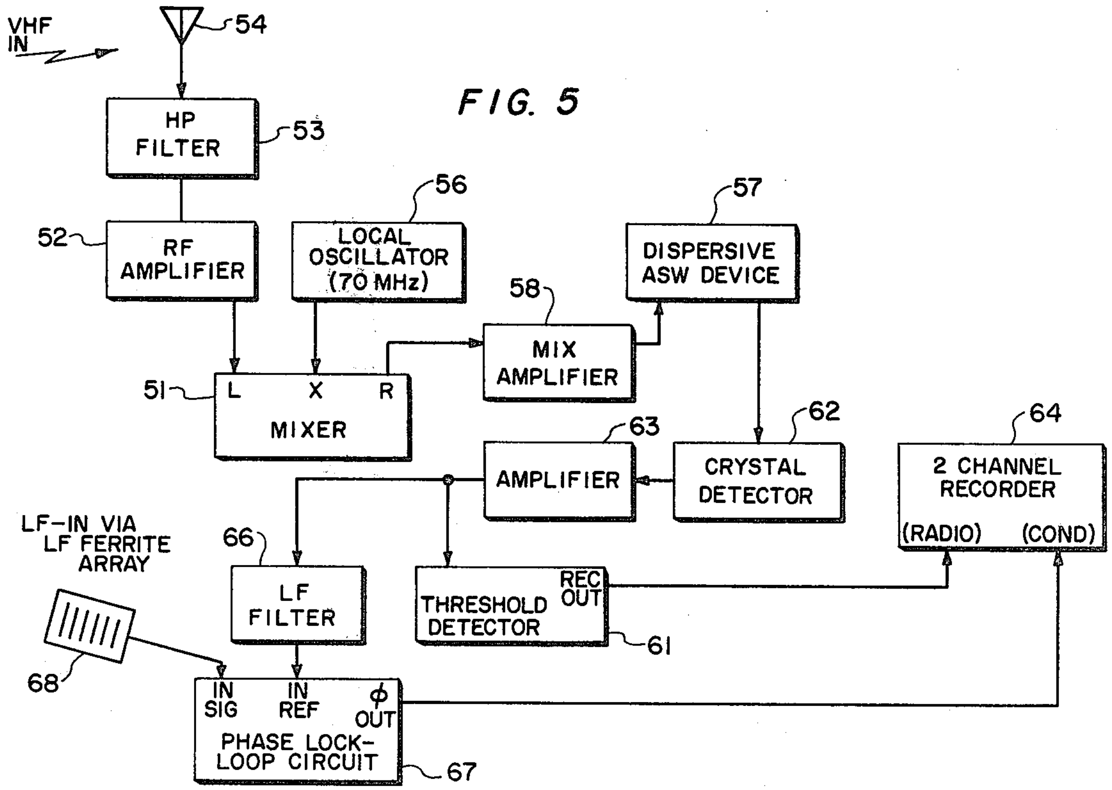
FIG. 5 is a block schematic diagram of a second illustrative clandestine receiver according to the invention for use with the transmitter shown in FIG. 4.

FIG. 5 depicts the corresponding arrangement at the receiver. As shown, the receiver includes a mixer 51 whose input is connected via RF amplifier 52 and a high-pass filter 53 to a VHF antenna 54. A local oscillator 56, illustratively at a frequency of 70 MHz, is also connected to mixer 51. The output of mixer 51 is connected to a surface acoustic wave device 57 via an amplifier 58. The output of device 57, in turn, is connected to a threshold detector 61 via a crystal RF detector 62 and an amplifier 63.

The output of detector 61 is connected to a 2 channel recorder 64. At the same time, the output of amplifier 63 is connected, via a LF filter 66, to the reference input of a phase-lock loop circuit 67. The input to phase-lock loop circuit 67 comes from a LF Ferrite array antenna 68 while the output of the phase-lock loop circuit is connected to recorder 64.

Figure 6:
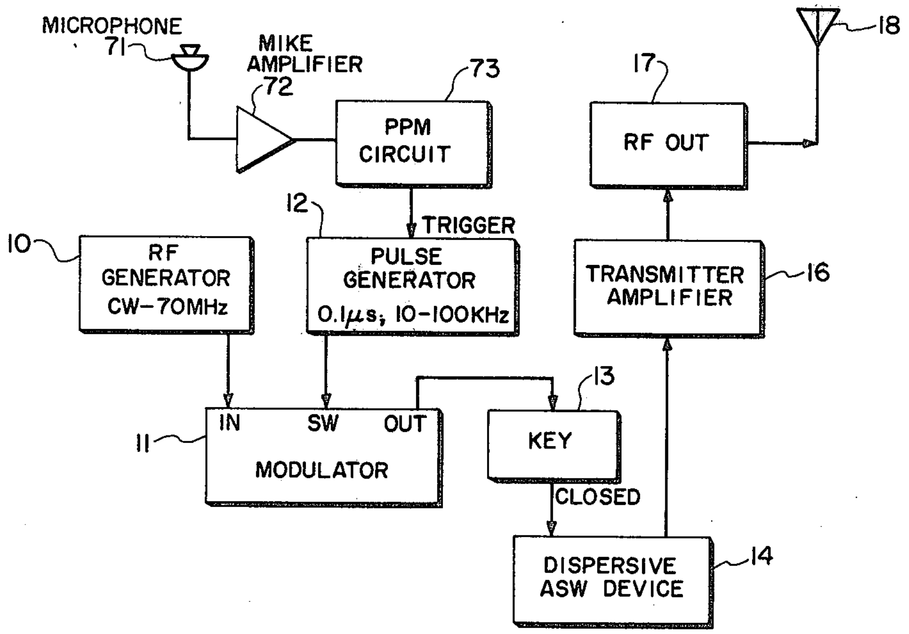
FIG. 6 is a block schematic diagram of a third illustrative transmitter employing pulse-position modulation.

As previously mentioned, it is possible to employ PPM modulation in the transmitter shown in FIG. 2. As shown in FIG. 6, this is achieved by connecting a microphone 71, an amplifier 72 and a PPM circuit 73 to the trigger input of pulse generator 12.

Figure 7:
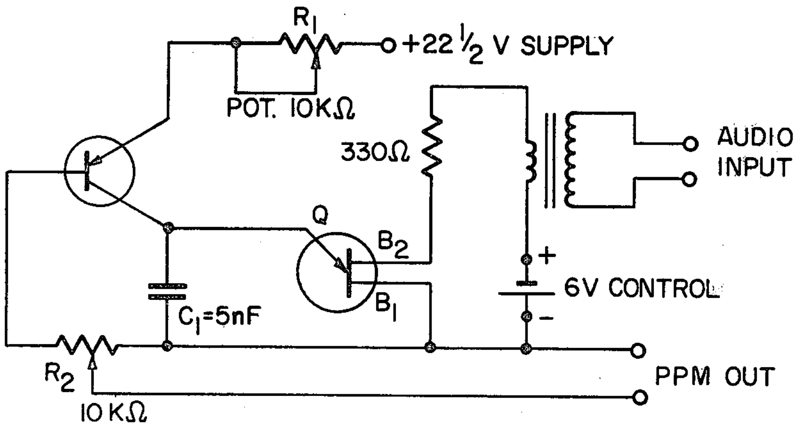
FIG. 7 is a schematic diagram of an illustrative pulse-position modulator for use with the transmitter shown in FIG. 6.

One suitable PPM circuit is shown in FIG. 7. This circuit responds to a change in the dc control voltage of a unijunction transistor Q, by changing the repetition rate of the generated saw tooth shaped pulses. Initially, this circuit was operated with a charging capacitor C=10 nF which yielded a variation of the pulse rate from 41 KHz to 5 KHz when the dc control voltage V was varied from 7.8 V to 18.5 V. When the charging capacitor was reduced to $C_1=5$ nf, a variation in pulse rate from 62 kHz to 30 kHz was obtained by varying the dc control voltage from 9 to 15 V. The pulse rate range was further increased from 59 kHz to 120 kHz, by lowering the supply voltage by means of the potentiometer $R_1$, and by changing the dc control voltage from 4.5 to 12 V. The desired position modulation of the generated pulse was then achieved by superimposing an audio-voltage over the dc control voltage which was set at 6 volts.

The audio signals (100 Hz to 2500 Hz) are derived from the amplified output of a microphone. The resultant pulse-position modulated output pulse was used to trigger the 0.1 microsecond pulse generator in the transmitter circuit.

Of course, transmission need not be over radio as co-axial cable, etc., could also be used.

One skilled in the art can make various changes and substitutions to the layout of parts shown without departing from the spirit and scope of the invention.

What is claimed is:

1. A method of transmitting clandestine signals from a first to a second location which comprises the following steps:

at said first location, (a) amplitude modulating the output of a first continuous wave oscillator with a periodic pulse train;

(b) dispersing the frequency spectrum of said modulated output in a first acoustic surface wave device;

(c) pulse modulating the input to said acoustic surface wave device with the signal to be transmitted;

(d) transmitting said dispersed spectrum to said second location, and at said second location, (e) mixing the incoming signal from said first location with the output of a second continuous wave oscillator having the identical frequency as said first continuous wave oscillator;

(f) applying the resultant IF signal to a second acoustic surface wave device to contract and restore the pulse modulated signal spectrum, said spectrum includng noise and pulse levels above said noise;

(g) detecting the output pulses from said second acoustic surface wave device exceeding said noise levels to recover the clandestine signal from the noise; and (h) applying the signal output to an output device.

2. The method according to claim 1 including the further steps of:

at said first location, (j) applying the output of a low frequency, continuous-wave oscillator to the trigger input of the source of said periodic pulse train;

(k) modulating the output of said low frequency continuous wave oscillator; and (l) transmitting said modulated low frequency signal to said second location over a separate transmission path; and at said second location, (m) applying the incoming low frequency signal to the input of a phase-lock loop circuit;

(n) filtering said detected output;

(o) applying said filtered output as a reference signal to said phase-lock loop circuit; and (p) applying the output of said phase-lock loop circuit to said output device.

3. The method according to claim 1 including the further steps of, at said first location, (j) pulse-position-modulating an incoming audio frequency signal; and (k) applying said pulse-position-modulated signal as a trigger signal to the source of said periodic pulse train.

4. The method according to claim 1 wherein said second acoustic surface wave device has a dispersion characteristic conjugate to that of said first acoustic surface wave device.

5. A clandestine transmitter which comprises:

a continuous wave oscillator;

a source of a periodic train of pulses;

means for amplitude modulating the output of said oscillator with the output of said pulse train source;

an acoustic surface wave device for dispersing the frequency spectrum of the output signal from said modulating means;

first means for transmitting the dispersed frequency spectrum to a second location;

a low frequency continuous wave source;

means for triggering said periodic pulse train source with the output of said low frequency continuous wave source; and second means for transmitting said low frequency signal to said second location over a different transmission path than that used to transmit the output of said frequency dispersing means.

6. A clandestine transmitter which comprises: a continuous wave oscillator; a source of a periodic train of pulses; means for amplitude modulating the output of said oscillator with the output of said pulse train source; means for supplying an audio-frequency signal to be transmitted; means for pulse-position-modulating said audio frequency signal; means for triggering said periodic pulse train source with the output of said pulse-position-modulating means; an acoustic surface wave device for dispersing the frequency spectrum of the output signal from said amplitude modulating means; and means for transmitting the dispersed frequency spectrum to a second location.

7. A clandestine receiver, which comprises:

means for receiving a clandestine signal transmitted from a remote location;

a source of continuous wave oscillations;

means for mixing said continuous wave oscillations with said received signal thereby to generate an intermediate frequency signal;

an acoustic surface wave device for contracting the frequency spectrum of said intermediate frequency signal;

means for detecting the signal output from said frequency spectrum contracting device;

a threshold detector connected to the output of said detecting means for discriminating between said detected signal and the ambient noise;

output means connected to the output of said threshold detector;

means for receiving a low frequency signal transmitted from said remote location over a transmission path which differs from the transmission path used to transmit said clandestine signal; and a phase-lock loop circuit having an input connected to said low frequency signal receiving means, an output connected to said output means, and a reference signal input connected to said detecting means.

8. Apparatus for transmitting clandestine signals from a first to a second location comprising:

a first continuous wave oscillator;

a pulse source generating a periodic pulse train;

means for amplitude modulating the output of said first oscillator with said periodic pulse train;

a first acoustic surface wave device dispersing the frequency spectrum of the amplitude modulated output;

means for pulse modulating the input to said acoustic surface wave device with the signal to be transmitted;

means for transmitting the dispersed spectrum to said second location;

a second continuous wave oscillator at said second location having the same frequency as said first oscillator;

means at said second location for mixing the incoming dispersed spectrum with the output of said second oscillator to provide an IF signal;

a second acoustic surface wave device receiving said IF signal and contracting and restoring the pulse modulated signal spectrum, said spectrum including noise and pulse levels above said noise; and means for detecting the output pulses from said second acoustic surface wave device exceeding said noise levels to recover the clandestine signal from the noise.

9. The apparatus of claim 8 wherein said second acoustic surface wave device has a dispersion characteristic conjugate to that of said first acoustic surface wave device.

* * * * *